United States Patent
Chang et al.

(10) Patent No.: US 7,714,636 B2
(45) Date of Patent: May 11, 2010

(54) CHARGE PUMP CIRCUIT AND CELL THEREOF

(75) Inventors: Chien-Yi Chang, Hsinchu (TW);
Chung-Hsien Hua, Taipei County (TW)

(73) Assignee: Elite Semiconductor Memory Technology Inc., Hsinchu (TW)

( * ) Notice: Subject to any disclaimer, the term of this patent is extended or adjusted under 35 U.S.C. 154(b) by 62 days.

(21) Appl. No.: 12/129,707

(22) Filed: May 30, 2008

(65) Prior Publication Data

US 2009/0134936 A1 May 28, 2009

Related U.S. Application Data

(60) Provisional application No. 60/989,985, filed on Nov. 26, 2007.

(51) Int. Cl.
*G05F 1/10* (2006.01)
(52) U.S. Cl. .................................................. 327/536
(58) Field of Classification Search ................ 327/536, 327/537, 589, 390; 363/59, 60
See application file for complete search history.

(56) References Cited

U.S. PATENT DOCUMENTS

| | | | | |
|---|---|---|---|---|
| 5,982,223 | A | * 11/1999 | Park et al. | 327/536 |
| 6,373,324 | B2 | * 4/2002 | Li et al. | 327/536 |
| 6,642,773 | B2 | 11/2003 | Lin et al. | |
| 6,690,227 | B2 | * 2/2004 | Lee et al. | 327/536 |
| 7,030,683 | B2 | 4/2006 | Pan et al. | |
| 7,446,596 | B1 | * 11/2008 | Fort et al. | 327/536 |

* cited by examiner

*Primary Examiner*—Hai L Nguyen
(74) *Attorney, Agent, or Firm*—Jianq Chyun IP Office

(57) ABSTRACT

A charge pump cell with an input and output nodes includes a first, second, and third equalization units, and a first, second, and third capacitors. The input node is coupled to the inputs of the first, second and third equalization units, and the output node is coupled to the second equalization unit. One end of the second capacitor is coupled to the control end of the first equalization unit for enabling or disabling the first equalization unit, and also coupled to the output of the third equalization unit. One end of the third capacitor is coupled to the output of the second equalization unit. One end of the first capacitor is coupled to the control ends of the second and third equalization units, and also coupled to the output of the first equalization unit.

20 Claims, 13 Drawing Sheets

CHARGE PUMP CIRCUIT AND CELL THEREOF

CROSS-REFERENCE TO RELATED APPLICATION

This application claims the priority benefit of U.S. provisional application Ser. No. 60/989,985, filed on Nov. 26, 2007. The entirety of the above-mentioned patent application is hereby incorporated by reference herein and made a part of this specification.

BACKGROUND OF THE INVENTION

1. Field of Invention

The present invention generally relates to the charge pump circuit and cell thereof, and more particularly to the charge pump circuit and cell thereof with faster start-up time.

2. Description of Prior Art

The semiconductor memories need a high voltage for writing data. However, the supply voltage is usually low, and thus a charge pump circuit is needed in the semiconductor memories.

Referring to FIGS. 1 and 2, FIG. 1 is a circuit diagram of a conventional charge pump circuit 10, and FIG. 2 is a waveform diagram of the clock signals in the charge pump circuit 10. The charge pump circuit 10 is a Dickson charge pump circuit. The charge pump circuit 10 comprises a plurality diodes D(1)~D(N+1) which are connected in series, a plurality of capacitors C(1)~C(N), Cout and inverters I(1)~I(N). The inverter I(k) is used to receive the clock signals CLK1 or CLK2, where k is a positive integer less than N+1. When k is even, the inverter I(k) is used to receive the clock signal CLK2; and when k is odd, the inverter I(k) is used to receive the clock signal CLK1. The output of the inverter I(k) is coupled to one end the capacitor C(k), and another end of the capacitor C(k) is coupled to the output of the diode D(k). The capacitor Cout is coupled to the output of the diode D(N+1).

Each two diodes, capacitors and inverters can be considered as a charge pump cell, such as the charge pump cell 101. The charge pump cell is used to pump the input voltage of the charge pump cell 101, and thus the output voltage increases. As shown in FIG. 1, the output voltage of the charge pump circuit is about (N+1)*Vcc. The capacitors C(1)~C(N) and Cout have the size limitations in the practical implementation, and thus the performance of the charge pump circuit 10 may be poor.

Referring to FIGS. 3 and 4, FIG. 3 is a circuit diagram of another conventional charge pump circuit 30, and FIG. 4 is a waveform diagram of the clock signals in the charge pump circuit 30. The charge pump circuit 30 is disclosed in the article of Lauterbach et al., "Charge Sharing Concept and New Clocking Scheme for Power Efficiency and Electromagnetic Emission Improvement of Boosted Charge Pumps" pressed by IEEE in May, 2005. The charge pump circuit 30 comprises a plurality of transistors M1~M4, T1~T5 and a plurality of capacitors C1~C8. The connections among the transistors M1~M4, T1~T5 and the capacitors C1~C8 are shown in FIG. 3, and are not described herein again.

The charge pump circuit 30 has the better power efficiency than that of the Dickson charge pump circuit. Furthermore, the charge pump circuit 30 improves the electromagnetic emission. However, the start-up time of the charge pump circuit 30 is not improved, and thus it is not suitable for the high speed operation system.

Referring to FIGS. 5 and 6, FIG. 5 is a circuit diagram of another conventional charge pump circuit 50, and FIG. 6 is a waveform diagram of the clock signals in the charge pump circuit 50. The charge pump circuit 50 is disclosed in U.S. Pat. No. 7,030,683. The charge pump circuit 50 comprises a plurality of transistors TR, T1, T2, diodes Td, a plurality of pre-charge diodes DPC, and a plurality of capacitors C0~C2. The connections among the transistors TR, T1, T2, the diodes Td, the pre-charge diodes DPC, and the capacitors C0~C2 are shown in FIG. 5, and are not described herein again.

In the Dickson charge pump in which the serially connected diodes sequentially respond to anti-phase 50/50 clock cross over or overlapped (CLK1, CLK2). However efficiency of the charge pump circuit 50 is increased by providing with each diode a charge transfer transistor T1 in parallel therewith between two adjacent nodes V1, V2, and driving the charge transfer transistor T1 to conduction during a time when the parallel diode Td is conducting thereby transferring any residual trapped charge at one node V1 through the charge transfer transistors T1 to the next node V2. Operating frequency can be increased by providing a pre-charge diode DPC coupling an input node to the gate of the charge transfer transistor T1 to facilitate conductance of the charge transfer transistor, and by coupling the control terminal of the charge transfer transistor T1 to an input node V1 in response to charge on an output node V2 to thereby equalize charge on the control terminal and on the input node V1 during a recovery period.

Although the charge pump circuit 50 has a good power efficiency, the charge pump circuit 50 needs the critical timing control of the clock signals phi1~phi4 (as shown in FIG. 6). However, the critical timing control increases the complexity of the charge pump circuit 50, and thus the charge pump circuit 50 may not operate at high speed.

Referring to FIGS. 7 and 8, FIG. 7 is a circuit diagram of another conventional charge pump circuit 70, and FIG. 8 is a waveform diagram of the clock signals in the charge pump circuit 70. The charge pump circuit 70 is disclosed in U.S. Pat. No. 6,642,773. The charge pump circuit 70 is used for generating high positive voltages. The charge pump circuit 70 has an input unit 101, a plurality of driving units 102, and an output unit 103. The charge pump circuit 70 has n-channel metal-oxide semiconductor (NMOS) transistors. Each of the driving units 102 has a plurality of capacitors 104, 106 and a plurality of transistors 108, 110, 112. A clock generator 114 is used for generating a first clock signal 115, a second clock signal 116, a third clock signal 117, and a fourth clock signal 118 inputted into the driving units 102. The connections among all of the elements of the charge pump circuit 70 are shown in FIG. 7, and are not described herein again.

If the charge pump circuit 70 has more driving units 102 cascaded in series, the charge pump circuit 70 can output a higher positive voltage. The voltage level of node Y varies according to the voltage level of node Z when the transistor 112 is turned on. Therefore the body effect is greatly cut down without reducing the actual output voltage and the efficiency of raising voltage levels is greatly improved. In addition, when one driving unit is operating, other adjacent driving units will not operate to interfere with the driving unit that is working. Although the charge pump circuit 70 has reduced the body effect and improved the efficiency, the driving capability and the start-up time have not been improved.

In order to solve these and other problems as stated above, the embodiment of the invention provides a charge pump circuit and cell thereof with fast start-up time and high driving capability.

SUMMARY OF THE INVENTION

Accordingly, the present invention is directed to a charge pump circuit and cell thereof.

The present invention provides a charge pump cell with an input and output nodes. The charge pump cell includes a first, second, and third equalization units, and a first, second, and third capacitors. Wherein the input node is coupled to the inputs of the first, second and third equalization units, and the output node is coupled to the second equalization unit. One end of the second capacitor is coupled to the control end of the first equalization unit for enabling or disabling the first equalization unit, and also coupled to the output of the third equalization unit. The other end of the second capacitor is coupled to a first clock signal. One end of the third capacitor is coupled to the output of the second equalization unit, and the other end of the third capacitor is coupled to the first clock signal. One end of the first capacitor is coupled to the control ends of the second and third equalization units for enabling or disabling the second and third equalization units, and also coupled to the output of the first equalization unit. The other end of the first capacitor is coupled to a fourth clock signal. The first equalization unit is used for equalizing the charges of the input and the output of the first equalization unit. The second equalization unit is used for equalizing the charges of the input and the output of the second equalization unit. The third equalization unit is used for equalizing the charges of the input and the output of the third equalization unit.

The present invention provides a charge pump circuit. The charge pump circuit includes an input unit, an output unit and at least one charge pump cell. The charge pump cell is coupled between the input and output units. The charge pump cell includes a first, second, and third equalization units, a first, second, and third capacitors, and an input and output nodes. Wherein the input node is coupled to the inputs of the first, second and third equalization units, and the output node is coupled to the second equalization unit. One end of the second capacitor is coupled to the control end of the first equalization unit for enabling or disabling the first equalization unit, and also coupled to the output of the third equalization unit. The other end of the second capacitor is coupled to a first clock signal. One end of the third capacitor is coupled to the output of the second equalization unit, and the other end of the third capacitor is coupled to the first clock signal. One end of the first capacitor is coupled to the control ends of the second and third equalization units for enabling or disabling the second and third equalization units, and also coupled to the output of the first equalization unit. The other end of the first capacitor is coupled to a fourth clock signal. The input unit is used to transmit an input voltage to the charge pump cell, and the output unit is used to receive an output voltage from the charge pump cell. The first equalization unit is used for equalizing the charges of the input and the output of the first equalization unit. The second equalization unit is used for equalizing the charges of the input and the output of the second equalization unit. The third equalization unit is used for equalizing the charges of the input and the output of the third equalization unit.

According to one embodiment of the present invention, the input unit includes a fourth and fifth equalization units, and a fourth and fifth capacitors. The input of the fourth equalization unit is coupled to the input of the input unit. The output of the fifth equalization unit is coupled to the output of the input unit. One end of the fourth capacitor is coupled to the output of the fourth equalization unit, and coupled to the control end of the fifth equalization unit for enabling or disabling the fifth equalization unit. The other end of the fourth capacitor is coupled to a second clock signal. One end of the fifth capacitor is coupled to the output of the fifth equalization unit, and coupled to the control end of the fourth equalization unit for enabling or disabling the fourth equalization unit. The other end of the fifth capacitor is coupled to a third clock signal. The fourth equalization unit is used for equalizing the charges of the input and the output of the fourth equalization unit. The fifth equalization unit is used for equalizing the charges of the input and the output of the fifth equalization unit.

According to one embodiment of the present invention, the output unit includes a sixth, seventh and eighth equalization units, and a sixth and seventh capacitors. The input of the output unit is coupled to the input of the sixth, seventh and eighth equalization units. The output of the output unit is coupled to the output of the seventh equalization unit. One end of the seventh capacitor is coupled to the control end of the sixth equalization unit for enabling or disabling the sixth equalization unit, and also coupled to the output of the fifth equalization unit. The other end of the seventh capacitor is coupled to the third clock signal. One end of the sixth capacitor is coupled to the control ends of the seventh and eighth equalization units for enabling or disabling the seventh and eighth equalization units, and also coupled to the output of the sixth equalization unit. The other end of the sixth capacitor is coupled to the second clock signal. The sixth equalization unit is used for equalizing the charges of the input and the output of the sixth equalization unit. The seventh equalization unit is used for equalizing the charges of the input and the output of the seventh equalization unit. The eighth equalization unit is used for equalizing the charges of the input and the output of the eighth equalization unit.

Accordingly, compared to the conventional charge pump circuit, the charge pump circuit provided by the embodiment of the invention has fast start-up time and high driving capability. Thus the charge pump circuit provided by the embodiment can save power consumption and be suitable for high speed circuit.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
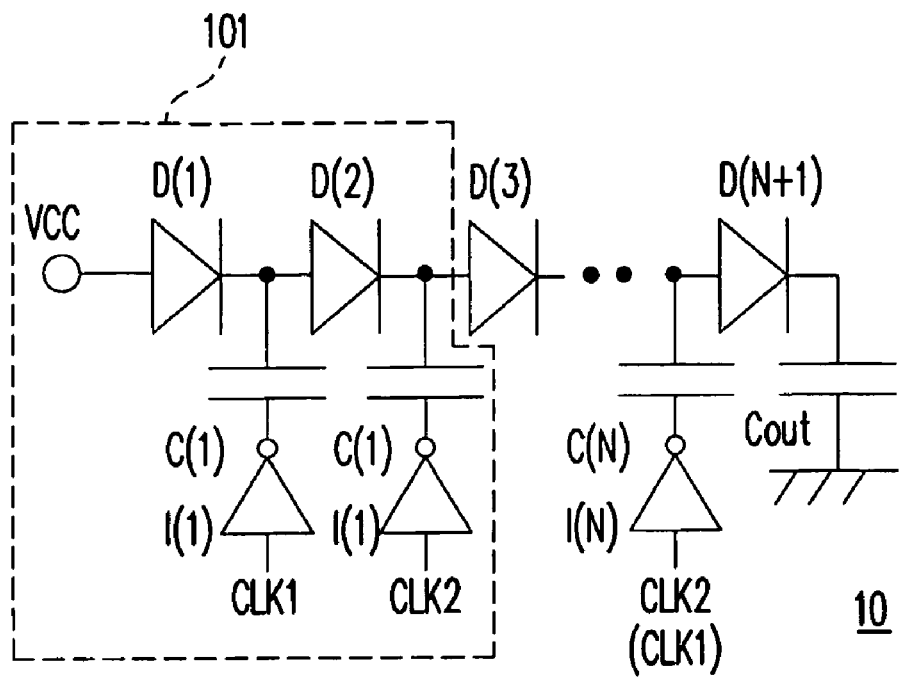
FIG. 1 is a circuit diagram of a conventional charge pump circuit 10.
Figure 2:
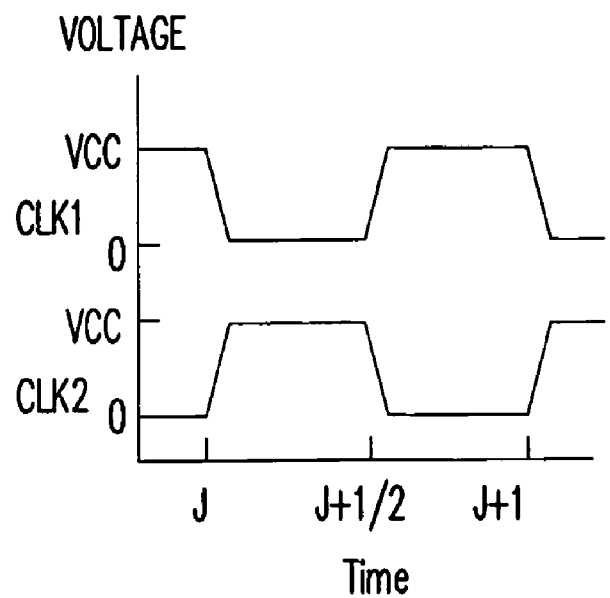
FIG. 2 is a waveform diagram of the clock signals in the charge pump circuit 10.
Figure 3:
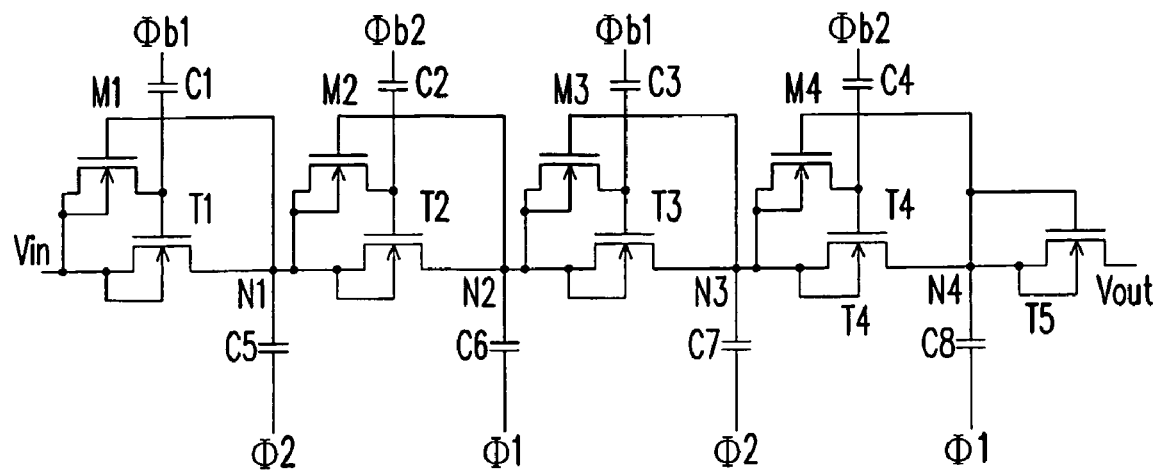
FIG. 3 is a circuit diagram of another conventional charge pump circuit 30.
Figure 4:
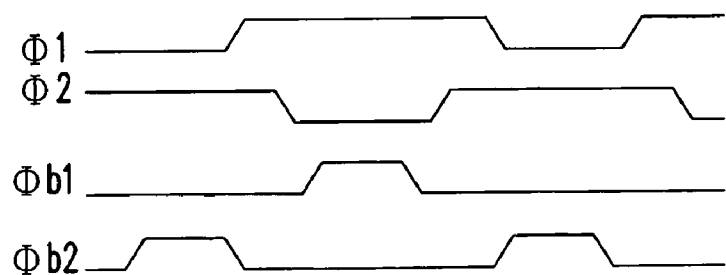
FIG. 4 is a waveform diagram of the clock signals in the charge pump circuit 30.
Figure 5:
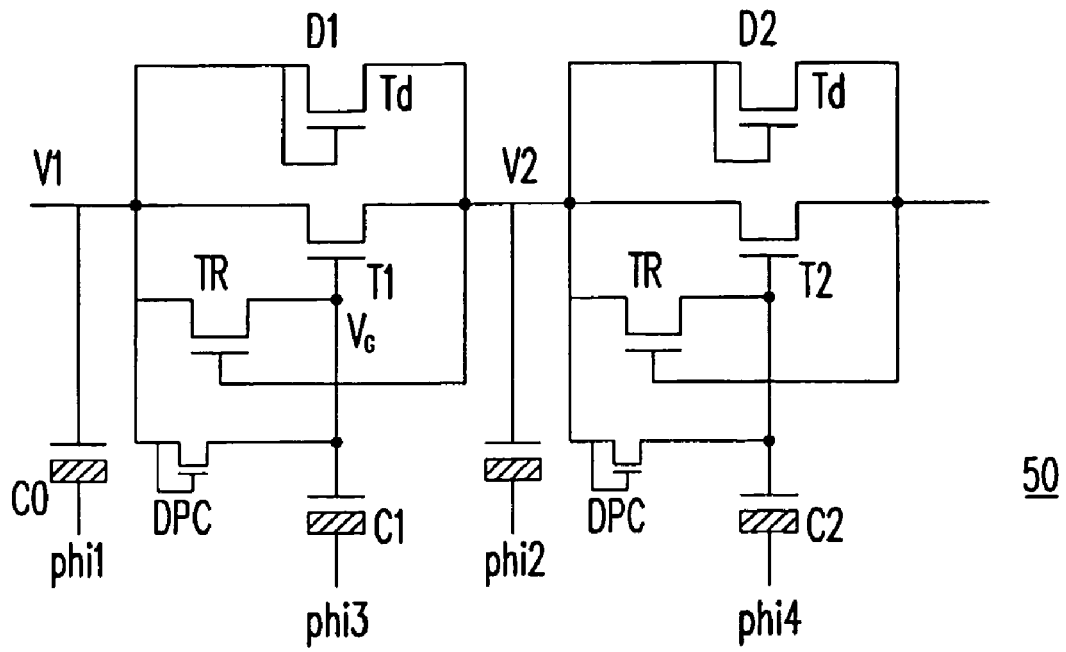
FIG. 5 is a circuit diagram of another conventional charge pump circuit 50.
Figure 6:
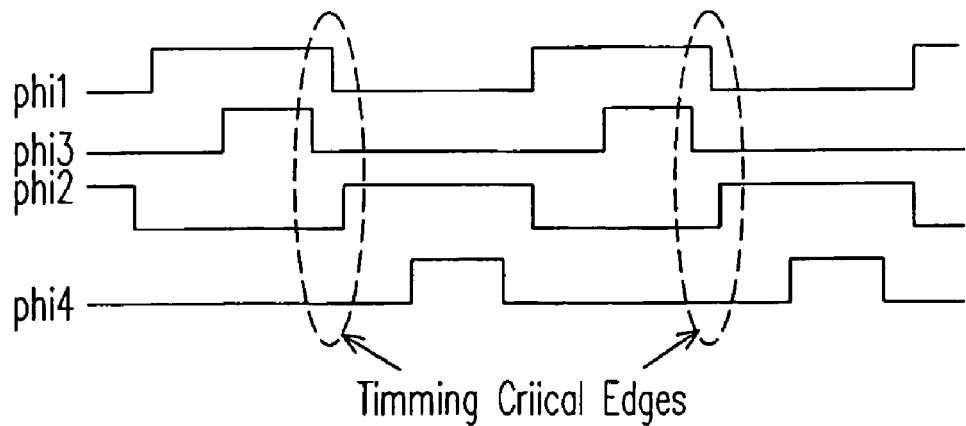
FIG. 6 is a waveform diagram of the clock signals in the charge pump circuit 50.
Figure 7:
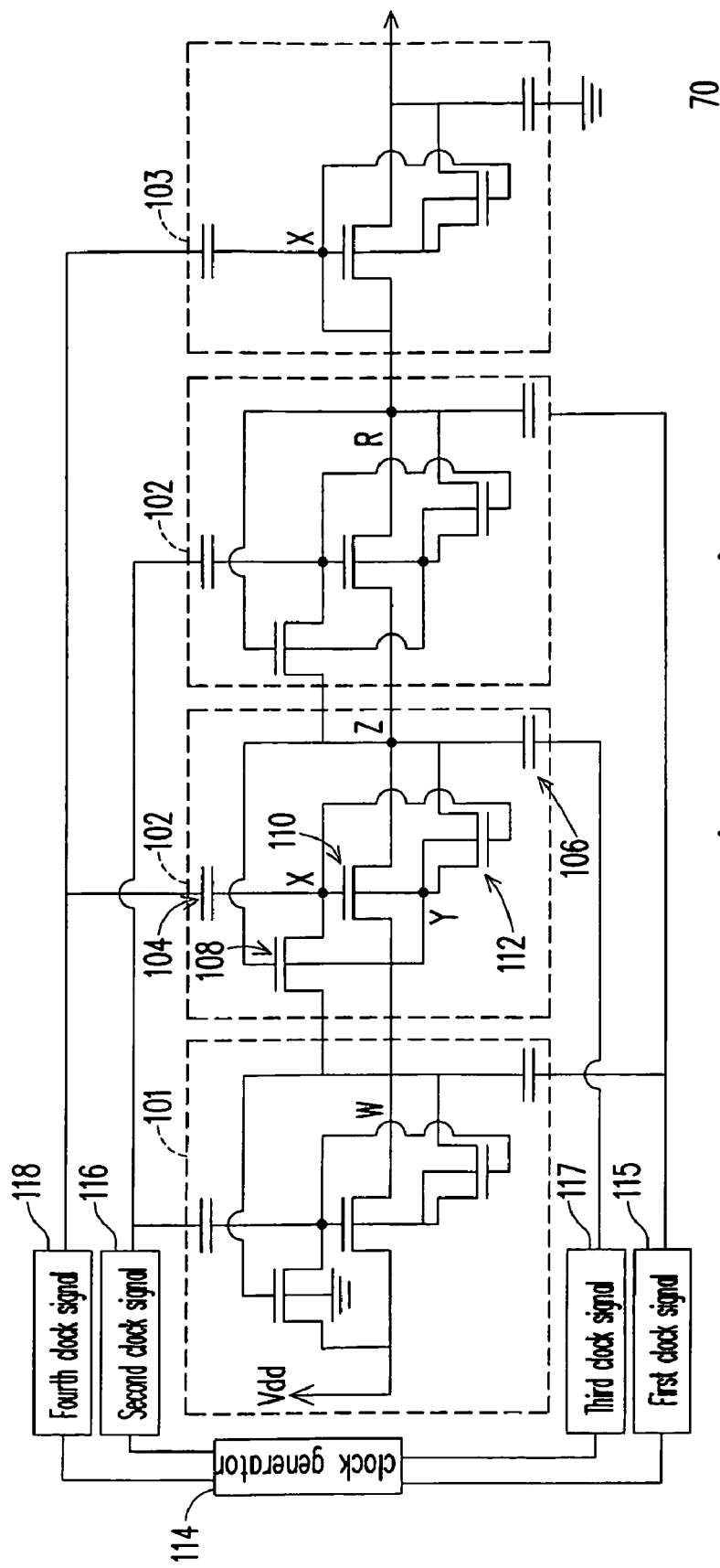
FIG. 7 is a circuit diagram of another conventional charge pump circuit 70.
Figure 8:
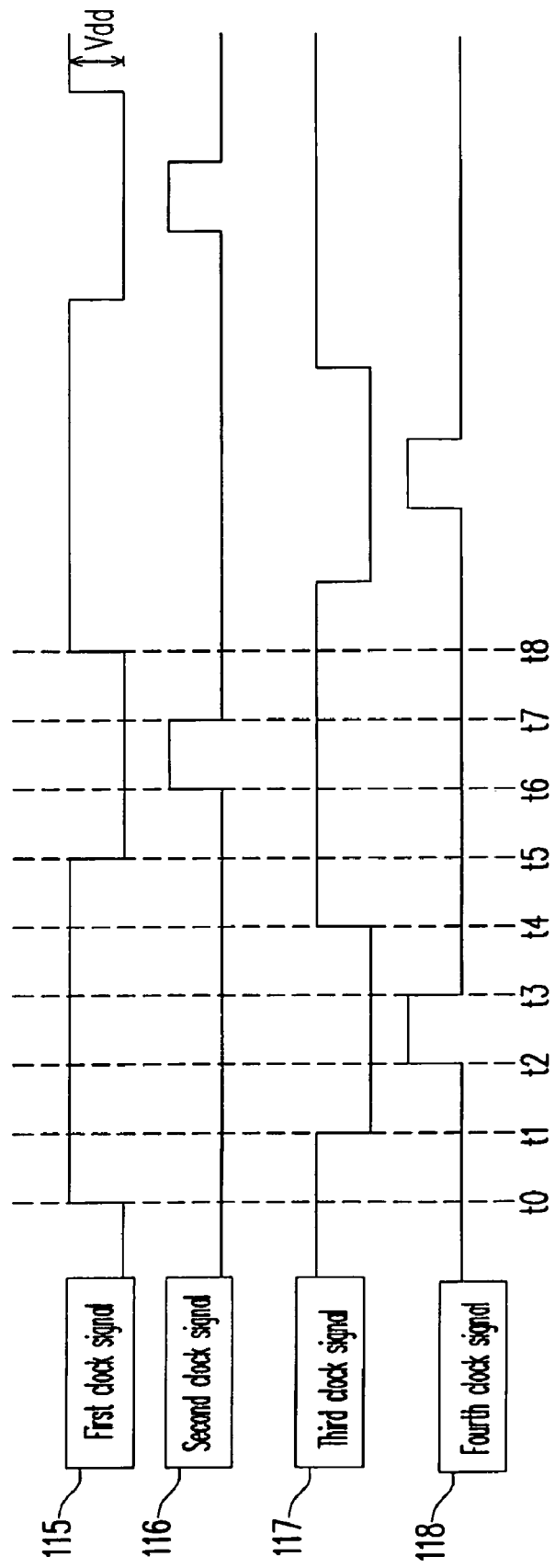
FIG. 8 is a waveform diagram of the clock signals in the charge pump circuit 70.

Reference will now be made in detail to the present preferred embodiment of the invention, examples of which are illustrated in the accompanying drawings. Wherever possible, the same reference numbers are used in the drawings and the description to refer to the same or like parts.

Figure 9:
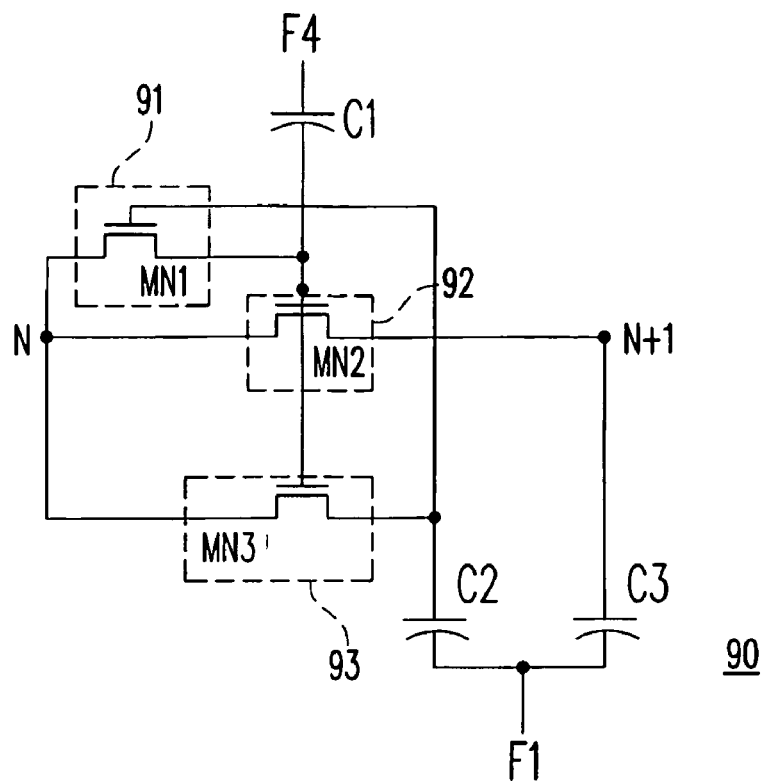
FIG. 9 is a circuit diagram of a charge pump cell 90 according to one embodiment of the present invention.

Referring to FIG. 9, FIG. 9 is a circuit diagram of a charge pump cell 90 according to one embodiment of the present invention. The charge pump cell 90 with an input and output nodes N, N+1 includes a plurality of equalization unit 91, 92 and 93, and a plurality of capacitors C1, C2 and C3. Each of the equalization units 91, 92 and 93 is used for equalizing the charges of its input and output.

Wherein the input node N is coupled to the inputs of the equalization units 91, 92 and 93. The output node N+1 is also coupled to the equalization unit 92. One end of the capacitor C2 is coupled to the control end of the equalization unit 91 for enabling or disabling the equalization unit 91, and also coupled to the output of the equalization unit 93. The other end of the capacitor C2 is coupled to a clock signal F1. One end of the capacitor C3 is coupled to the output of the equalization unit 92, and the other end of the capacitor C3 is coupled to the clock signal F1. One end of the capacitor C1 is coupled to the control ends of the equalization units 92 and 93 for enabling or disabling the equalization units 92 and 93, and also coupled to the output of the equalization unit 91. The other end of the capacitor C1 is coupled to the clock signal F4.

In the embodiment, the equalization units 91, 92 and 93 are NMOS transistors MN1, MN2 and MN3. The inputs of the equalization units 91, 92 and 93 are the drains of the NMOS transistors MN1, MN2 and MN3, and the outputs of the equalization units 91, 92 and 93 are the sources of the NMOS transistors MN1, MN2 and MN3. Furthermore, the control ends of the equalization units 91, 92 and 93 are the gates of the NMOS transistors MN1, MN2 and MN3. However, the equalization units implemented by the NMOS transistors are not intended to limit the scope of the present invention. In the embodiment, the voltage will be pumped with a positive direction.

Figure 10:
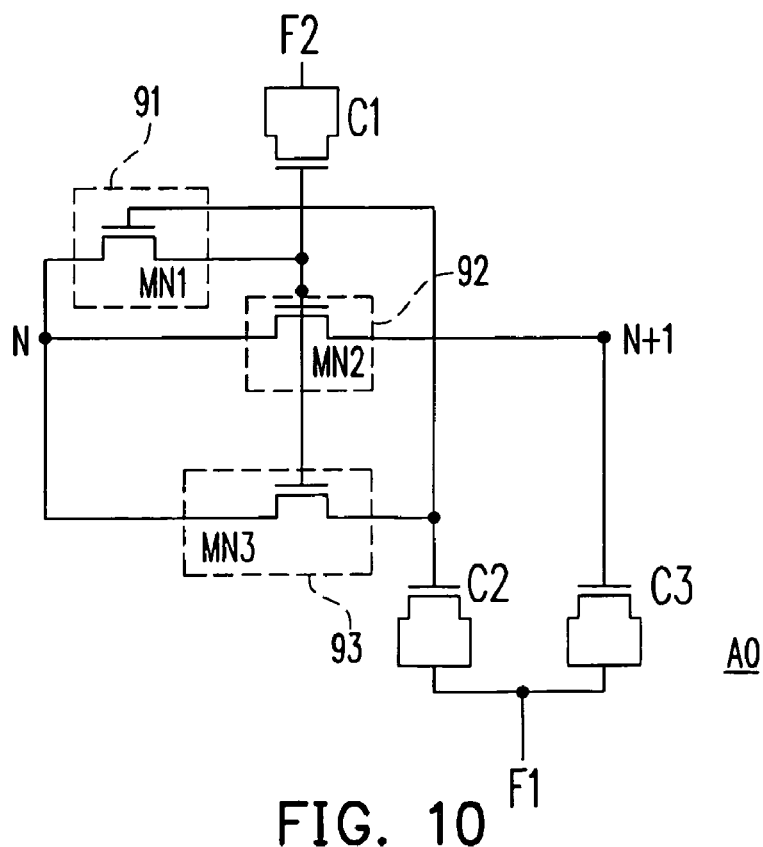
FIG. 10 is the circuit diagram of another charge pump cell A0 according to one embodiment of the present invention.

In addition, referring to FIG. 10, FIG. 10 is the circuit diagram of another charge pump cell A0 according to one embodiment of the present invention. Differing from FIG. 9, each of the capacitors C1, C2 and C 3 in the charge pump circuit A0 is implemented by the NMOS transistor which drain is coupled its source. However, the implementation of the capacitors C1, C2 and C 3 is not intended to limit the scope of the present invention.

Compared to the conventional charge pump circuit, the charge pump cell 90 may have the higher voltage at the output node N+1 under the same capability, and have higher driving capability under the same output pumped voltage at the output node N+1. Furthermore, the charge pump cell 90 has the faster start-up time than that of the conventional charge pump circuit. That is because capacitor C3 is used to help to pump the voltage, and the capacitor C2 is used to turn on the equalization unit 91 to pre-charge the capacitor C1. Thus the charge pump cell 90 may have the stated advantages.

Figure 11:
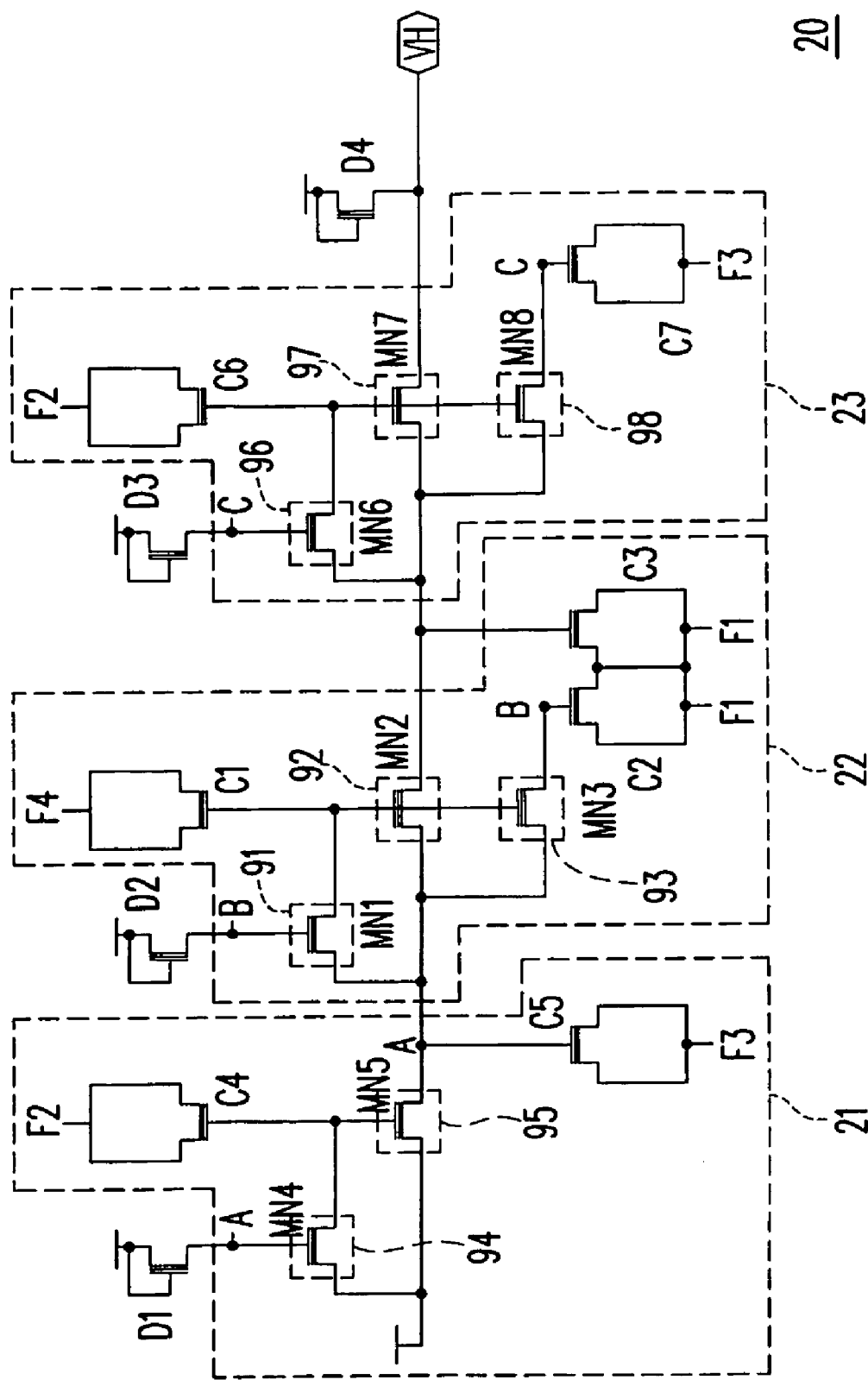
FIG. 11 is a circuit diagram of a 3-stage charge pump circuit 20 according one embodiment of the present invention.

Referring to FIG. 11, FIG. 11 is a circuit diagram of a 3-stage charge pump circuit 20 according one embodiment of the present invention. The charge pump circuit 20 comprises a plurality of diodes D1~D4, an input unit 21, a charge pump cell 22 and an output unit 23. The charge pump cell 22 is coupled between the input and output units 21, 23. The charge pump cell 22 is similar with the charge pump cell A0 in FIG. 10, and it is not described herein again. The input unit 21 is used to transmit an input voltage to the charge pump cell 22, and the output unit 23 is used to receive an output voltage from the charge pump cell 22.

The input unit 21 includes equalization units 94, 95, and capacitors C4, C5. The input of the equalization unit 94 is coupled to the input of the input unit 21. The output of the equalization unit 95 is coupled to the output of the input unit 21. One end of the capacitor C4 is coupled to the output of the equalization unit 94, and coupled to the control end of the equalization unit 95 for enabling or disabling the equalization unit 95. The other end of the capacitor C4 is coupled to a second clock signal F2. One end of the capacitor C5 is coupled to the output of the equalization unit 95, and coupled to the control end of the equalization unit 94 for enabling or disabling the equalization unit 94. The other end of the capacitor C5 is coupled to a third clock signal F3. Each of the equalization units 94, 95 is used for equalizing the charges of its input and the output.

The output unit 23 includes equalization units 96, 97, 98 and capacitors C6 and C7. The input of the output unit 23 is coupled to the input of the equalization units 96~98. The output of the output unit 23 is coupled to the output of the equalization unit 97. One end of the capacitor C7 is coupled to the control end of the equalization unit 96 for enabling or disabling the equalization unit 96, and also coupled to the output of the equalization unit 98. The other end of the capacitor C7 is coupled to the third clock signal F3. One end of the capacitor C6 is coupled to the control ends of the equalization units 97, 98 for enabling or disabling the equalization units 97, 98, and also coupled to the output of the equalization unit 96. The other end of the capacitor C6 is coupled to the second clock signal F2. Each of the equalization units 96, 97, 98 is used for equalizing the charges of its input and the output. The equalization units 91~98 may be NMOS transistors MN1~MN8 as stated above, and the implementations of the equalization units 91~98 are not intended to limit the scope of the present invention.

The output of the diode D1 is coupled to the control end of the equalization unit 94. The output of the diode D2 is coupled to the control end of the equalization unit 91. The output of the diode D3 is coupled to the control end of the equalization unit 96. The output of the diode D4 is coupled to the output of the equalization unit 97. Each of the diode D1~D4 may be a NMOS transistor which gate is coupled to its source, but this implementation is not intended to limit the present invention. Furthermore, in the embodiment the charge pump circuit 20 may be modified to become a k-stage charge pump circuit by adding the charge pump cells 22 between the input and output units 21, 23.

Figure 12:
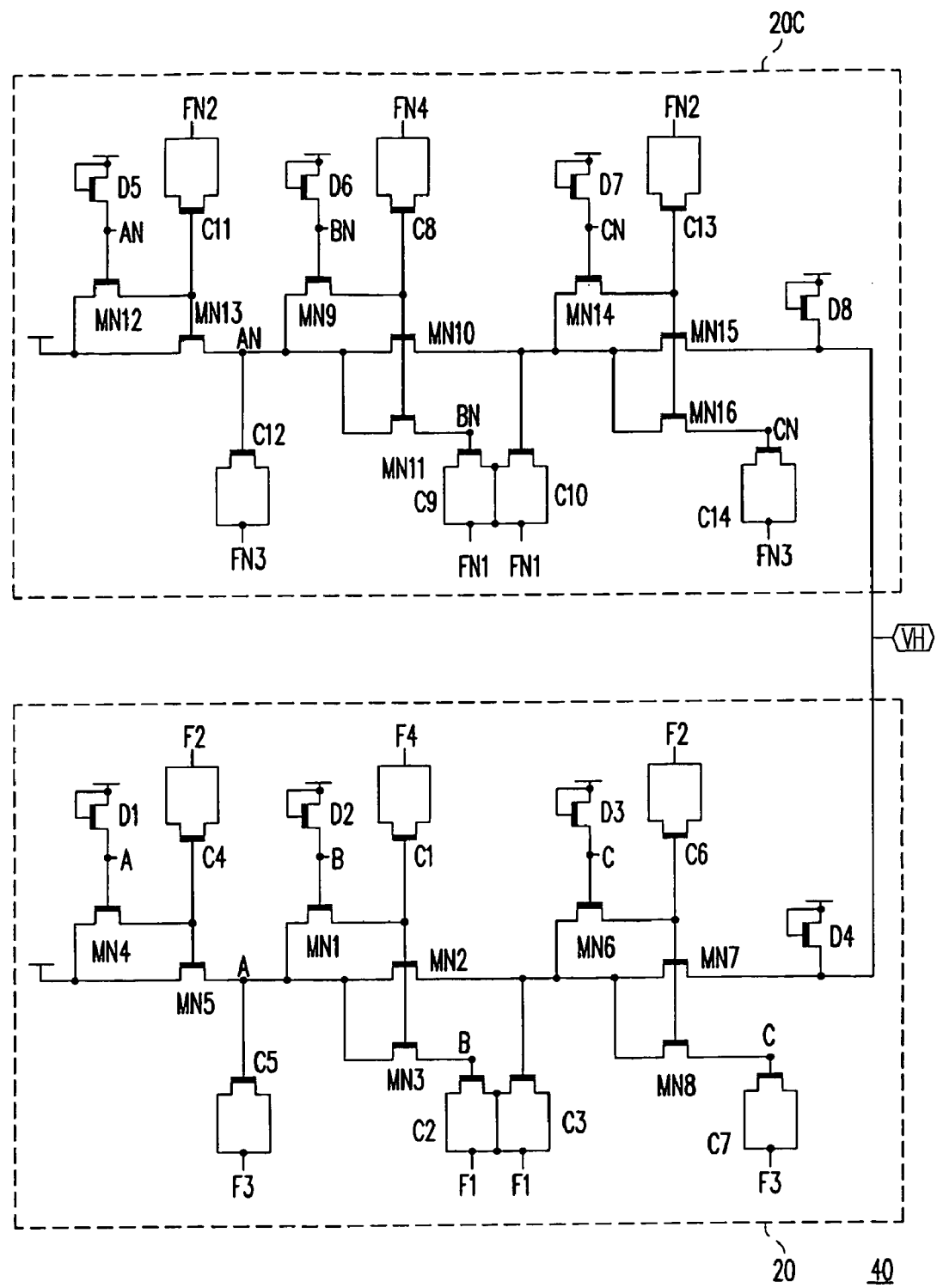
FIG. 12 is a circuit diagram of 3-stage dual charge pump circuit 40 according to one embodiment of the present invention.

Referring to FIG. 12, FIG. 12 is a circuit diagram of 3-stage dual charge pump circuit 40 according to one embodiment of the present invention. The dual charge pump circuit 40 may be used in pinfish, and the ripple noise is reduced. The dual charge pump circuit 40 comprises two charge pump circuits 20 and 20C which are connected in shunt. The difference of the charge pump circuits 20 and 20C are the clock signals which the capacitors receive. The structure of the charge pump circuits 20 and 20C may be same as each other.

Figure 13:
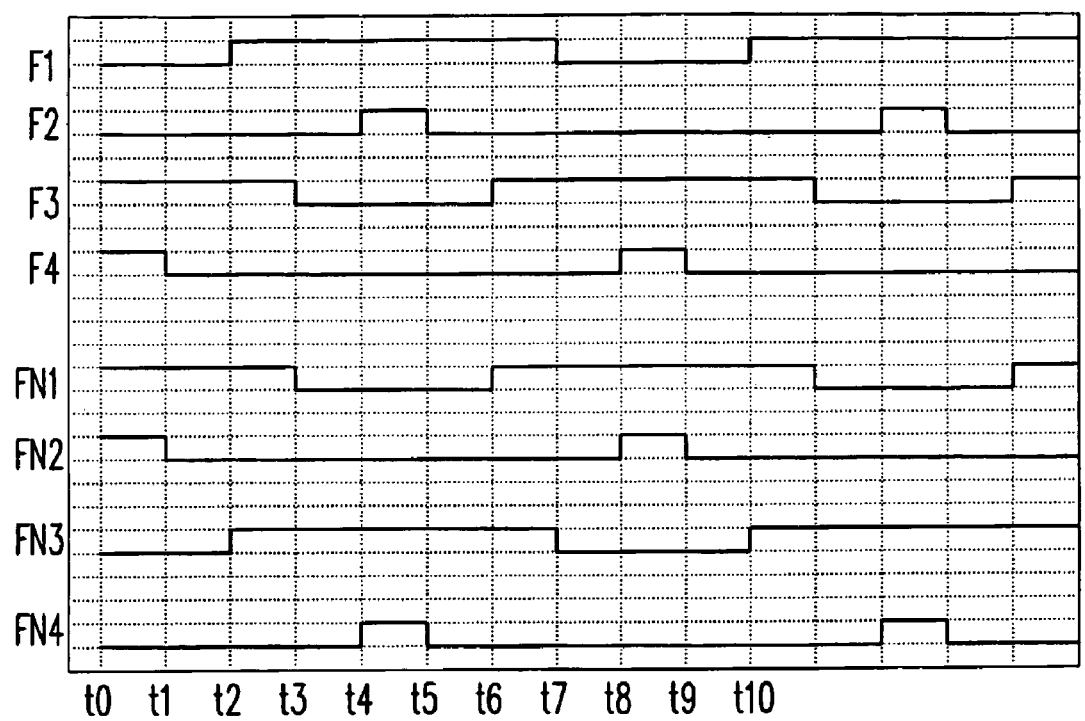
FIG. 13 is waveform diagram of the clock signals in the dual charge pump circuit 40.

Referring to FIG. 13, FIG. 13 is waveform diagram of the clock signals in the dual charge pump circuit 40. In addition, the clock signals F1~F4 is also suitable to the charge pump circuit 20. At time to, the NMOS transistors MN2, MN3, MN4, MN6, MN9, MN13, MN15, and MN16 are turned on, and the charges are moved into capacitors C2, C3, C4, C6, C8, C12 and C14. That is at time t0 the capacitors C2, C3, C4, C6, C8, C12 and C14 are pre-charged. At time t1, the NMOS transistors MN4, MN6 and MN9 are turned on, and the capacitors C4, C6 and C8 are pre-charged.

At time t2, the NMOS transistors MN1, MN4, MN6, MN9, MN12 and MN14 turned on, and the charges are moved into the capacitors C1, C4, C6, C8, C11 and C13. Now, the voltage of the drains of the NMOS transistors MN2, MN13 and MN15 are pumped. At time t3, the NMOS transistors MN1, MN12 and MN14 turned on, and the charges are moved into the capacitors C1, C11 and C13. At time t4, the NMOS transistors MN1, NN5, MN7, MN8, MN10, MN11, MN12 and MN14 turned on, and the capacitors C1, C5, C7, C9, C10, C1 and C13 are charged.

At time t5, the NMOS transistors MN1, MN12 and MN14 turned on, and the charges are moved into the capacitors C1, C11 and C13. At time t6, the NMOS transistors MN1, MN4, MN6, MN9, MN12 and MN14 turned on, and the charges are moved into the capacitors C1, C4, C6, C8, C1 and C13. At time t7, the NMOS transistors MN4, MN6 and MN9 turned on, and the charges are moved into the capacitors C4, C6 and C8.

With the operations stated above, the dual charge pump circuit 90B may get 2*VDD output voltage, if the input voltage of the dual charge pump circuit 90B is VDD and the clock signals F1~F4, FN1~FN4 have the peak VDD. It is noted that the clock signals F1 and F4 are not overlapped when they are at the high level. The clock signals F3 and F4 are also non-overlapped when they are at the high level. The clock signals FN1 and FN4 are not overlapped when they are at the high level. The clock signals FN2 and FN3 are non-overlapped when they are at the high level.

FIGS. 9-13 are used to obtain a positive higher voltage, since the equalization units are implemented by NMOS transistors. However, in some case, a negative higher voltage may be required. In this case, the equalization units may be implemented by p-channel metal-oxide semiconductor (PMOS) transistors.

Figure 14:
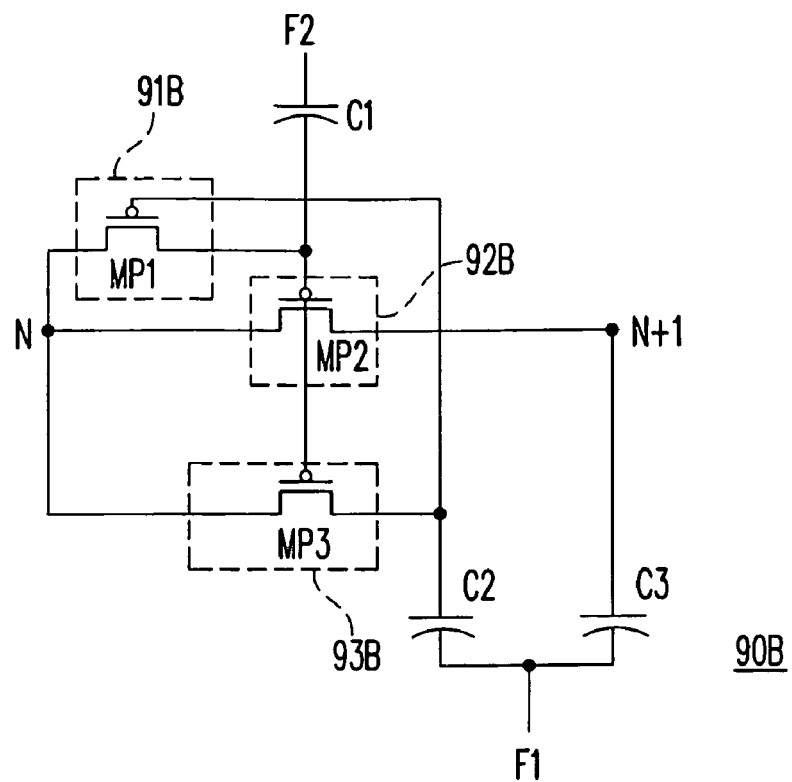
FIG. 14 is a circuit diagram of a charge pump cell 90B according to one embodiment of the present invention.

Referring to FIG. 14, FIG. 14 is a circuit diagram of a charge pump cell 90B according to one embodiment of the present invention. Wherein the equalization units 91B, 92B, 93B are implemented by PMOS transistors MP1, MP2, MP3. The inputs of the equalization units 91B, 92B and 93B are the sources of the PMOS transistors MP1, MP2 and MP3, and the outputs of the equalization units 91B, 92B and 93B are the drains of the NMOS transistors MP1, MP2 and MP3. Furthermore, the control ends of the equalization units 91B, 92B and 93B are the gates of the PMOS transistors MP1, MP2 and MP3.

Figure 15:
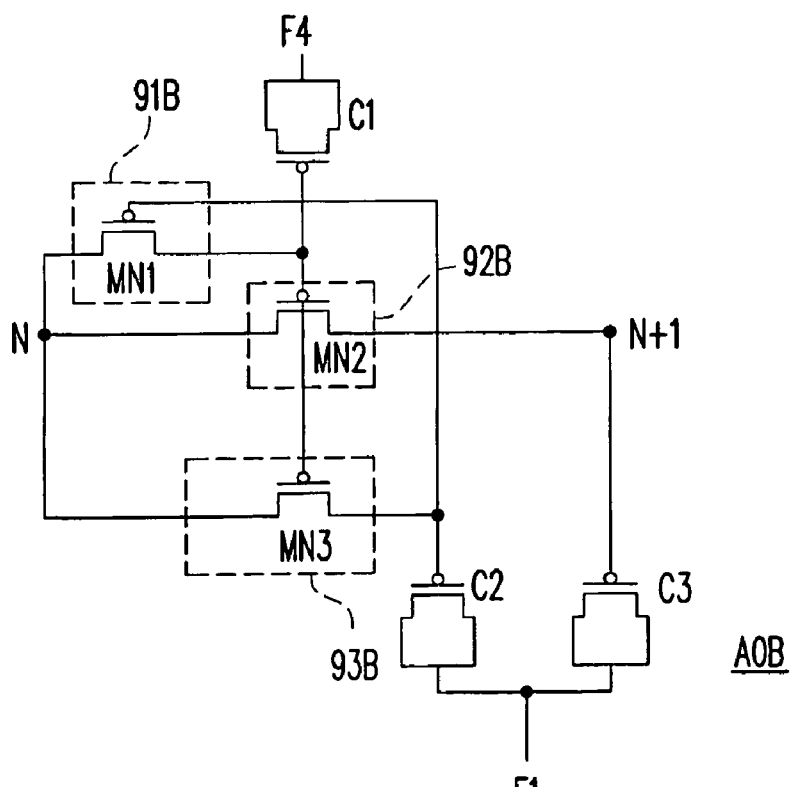
FIG. 15 is a circuit diagram of a charge pump cell A0B according to one embodiment of the present invention.

Referring to FIG. 15, FIG. 15 is a circuit diagram of a charge pump cell A0B according to one embodiment of the present invention. Each of the capacitors C1~C3 of the charge pump cell A0B is implemented by a PMOS transistor which source and gate are coupled to each other.

Figure 16:
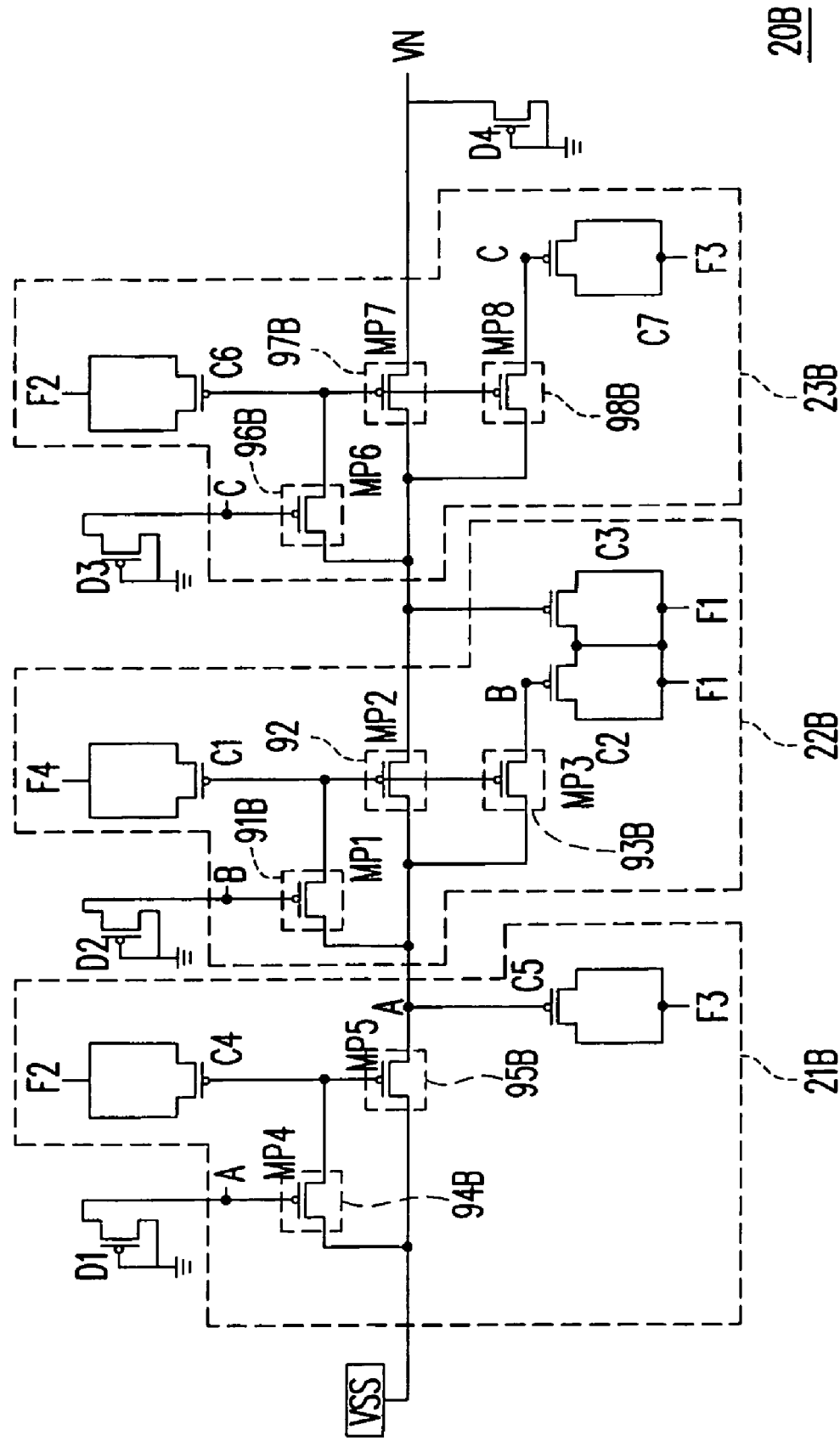
FIG. 16 is a circuit diagram of a 3-stage charge pump circuit 20B according one embodiment of the present invention.

Referring to FIG. 16, FIG. 16 is a circuit diagram of a 3-stage charge pump circuit 20B according one embodiment of the present invention. The equalization units 91B~98B are implemented by PMOS transistors MP1~MP8 as stated above. The input of the diode D1 is coupled to the control end of the equalization unit 94B. The input of the diode D2 is coupled to the control end of the equalization unit 91B. The input of the diode D3 is coupled to the control end of the equalization unit 96B. The input of the diode D4 is coupled to the output of the output unit 23B. Each of the diodes D1~D4 is implemented by the PMOS transistor which gate is coupled to its drain.

Figure 17:
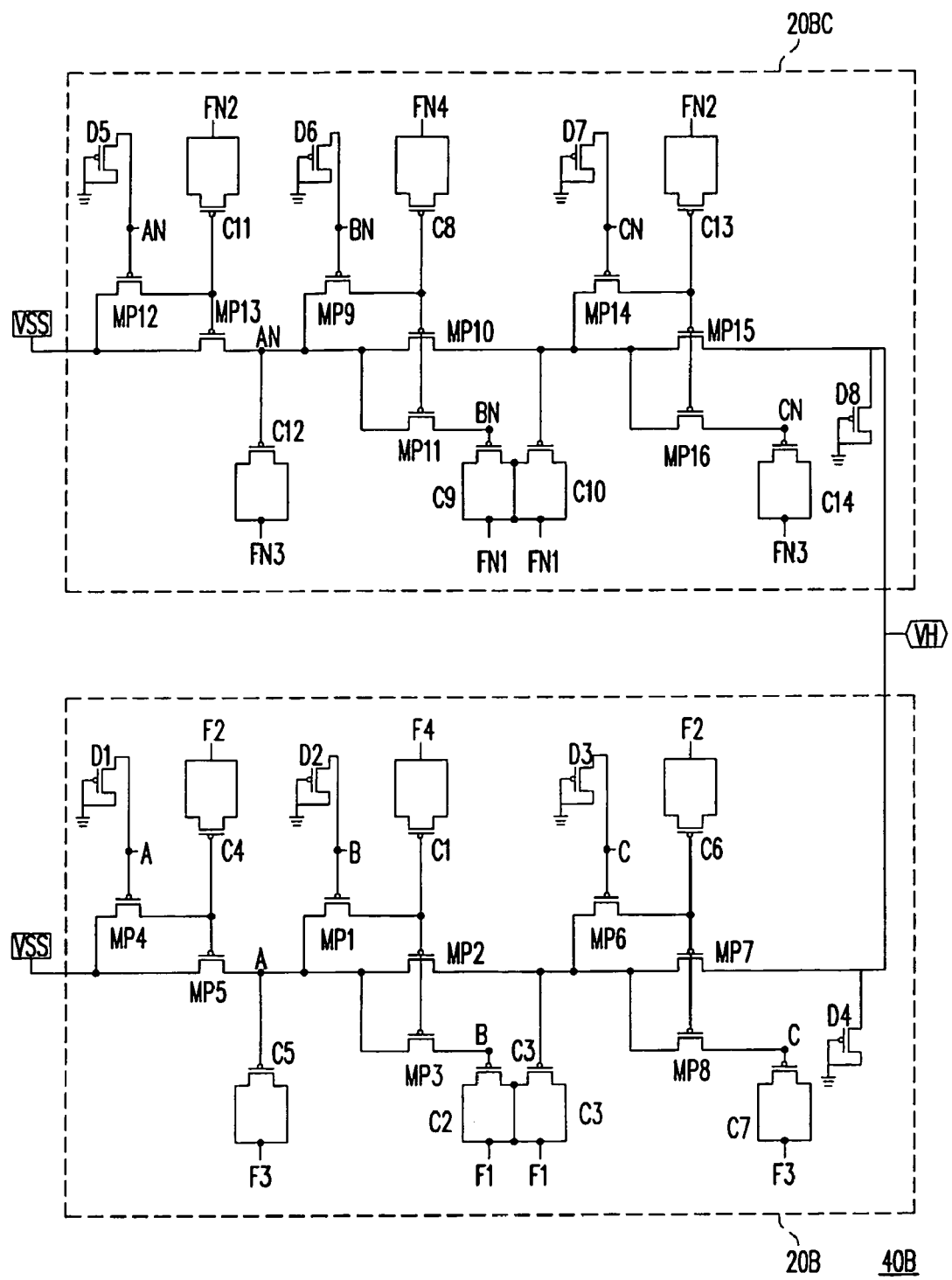
FIG. 17 is a circuit diagram of 3-stage dual charge pump circuit 40B according to one embodiment of the present invention.

Referring to FIG. 17, FIG. 17 is a circuit diagram of 3-stage dual charge pump circuit 40B according to one embodiment of the present invention. The dual charge pump circuit 40B may be used in pinfish, and the ripple noise is reduced. The dual charge pump circuit 40B comprises two charge pump circuits 20B and 20BC which are connected in shunt. The difference of the charge pump circuits 20B and 20BC are the clock signals which the capacitors receive. The structure of the charge pump circuits 20B and 20BC may be same as each other.

Figure 18:
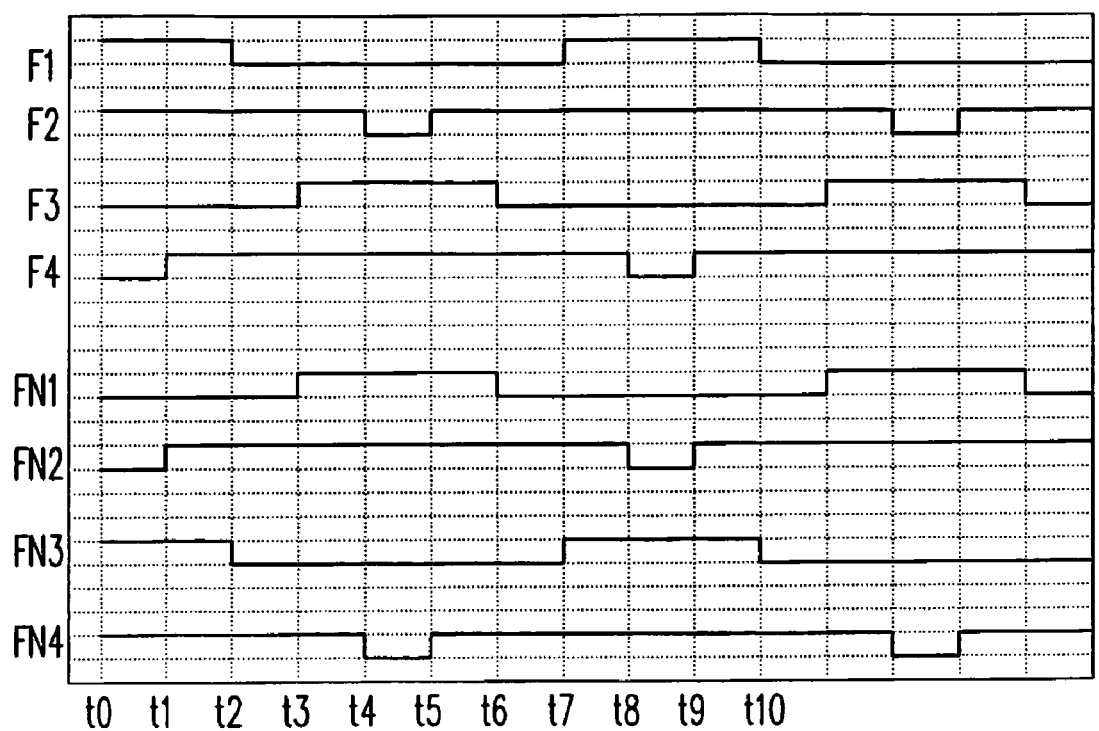
FIG. 18 is waveform diagram of the clock signals in the dual charge pump circuit 40B.

Referring to FIG. 18, FIG. 18 is waveform diagram of the clock signals in the dual charge pump circuit 40B. In addition, the clock signals F1~F4 is also suitable to the charge pump circuit 20B. The operation of the dual charge pump circuit 40B can be deduced by the operation of the dual charge pump circuit 40, and it is not described herein. It is noted that the clock signals F1 and F4 are not overlapped when they are at the low level. The clock signals F3 and F4 are also non-overlapped when they are at the low level. The clock signals FN1 and FN4 are not overlapped when they are at the low level. The clock signals FN2 and FN3 are non-overlapped when they are at the low level.

Compared to the conventional charge pump circuit, the charge pump circuit provided by the embodiment of the invention has faster start-up time and higher driving capability. Thus the charge pump circuit provided by the embodiment can save power consumption and be suitable for high speed circuit.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A charge pump cell with an input and output nodes, comprising:
   a first equalization unit, for equalizing charges of an input and output of the first equalization unit, the input of the first equalization unit is coupled to the input node;

a second equalization unit, for equalizing charges of an input and output of the second equalization unit, the input of the second equalization unit is coupled to the input node, and the output of the second equalization unit is coupled to the output node;

a third equalization unit, for equalizing charges of an input and output of the third equalization unit, the input of the third equalization unit is coupled to the input node;

a first capacitor, one end of the first capacitor is coupled to control ends of the second and third equalization units for enabling or disabling the second and third equalization units, and coupled to the output of the first equalization unit, another end of the first capacitor is coupled to a fourth clock signal, a second capacitor, one end of the second capacitor is coupled to a control end of the first equalization unit for enabling or disabling the first equalization unit, and coupled to the output of the third equalization unit, another end of the second capacitor is coupled to a first clock signal; and a third capacitor, one end of the second capacitor is coupled to the output of the second equalization unit, another end of the third capacitor is coupled to the first clock signal.

2. The charge pump cell as claim 1, wherein the first, second and third capacitors are NMOS transistors which sources and drains are coupled to each other respectively.

3. The charge pump cell as claim 1, wherein the first, second and third equalization units are a first, second and third NMOS transistors respectively, gates of the first, second and third NMOS transistors are the control ends of the first, second and third equalization units, drains of the first, second and third NMOS transistors are the inputs of the first, second and third equalization units, and sources of the first, second and third NMOS transistors are the outputs of the first, second and third equalization units.

4. The charge pump cell as claim 3, wherein the first and fourth clock signals are non-overlapped when the first and fourth clock signals are in a high level.

5. The charge pump cell as claim 1, wherein the first, second and third capacitors are PMOS transistors which sources and drains are coupled to each other respectively.

6. The charge pump cell as claim 1, wherein the first, second and third equalization units are a first, second and third PMOS transistors respectively, gates of the first, second and third PMOS transistors are the control ends of the first, second and third equalization units, sources of the first, second and third PMOS transistors are the inputs of the first, second and third equalization units, and drains of the first, second and third PMOS transistors are the outputs of the first, second and third equalization units.

7. The charge pump cell as claim 6, wherein the first and fourth clock signals are non-overlapped when the first and fourth clock signals are in a low level.

8. A charge pump circuit, used for pumping an input voltage, comprising:

an input unit, having an input and output of the input unit;

an output unit, having an input and output of the output unit; and at least one charge pump cell with an input and output nodes, coupled between the input and output units, comprising:

a first equalization unit, for equalizing charges of an input and output of the first equalization unit, the input of the first equalization unit is coupled to the input node;

a second equalization unit, for equalizing charges of an input and output of the second equalization unit, the input of the second equalization unit is coupled to the input node, and the output of the second equalization unit is coupled to the output node;

a third equalization unit, for equalizing charges of an input and output of the third equalization unit, the input of the third equalization unit is coupled to the input node;

a first capacitor, one end of the first capacitor is coupled to control ends of the second and third equalization units for enabling or disabling the second and third equalization units, and coupled to the output of the first equalization unit, another end of the first capacitor is coupled to a fourth clock signal, a second capacitor, one end of the second capacitor is coupled to a control end of the first equalization unit for enabling or disabling the first equalization unit, and coupled to the output of the third equalization unit, another end of the second capacitor is coupled to a first clock signal; and a third capacitor, one end of the second capacitor is coupled to the output of the second equalization unit, another end of the third capacitor is coupled to the first clock wherein the input unit is used to transmit an input voltage to the charge pump cell, and the output unit is used to receive an output voltage from the charge pump cell.

9. The charge pump circuit as claim 8, wherein the first, second and third equalization units are a first, second and third PMOS transistors respectively, gates of the first, second and third PMOS transistors are the control ends of the first, second and third equalization units, sources of the first, second and third PMOS transistors are the inputs of the first, second and third equalization units, and drains of the first, second and third PMOS transistors are the outputs of the first, second and third equalization units.

10. The charge pump cell as claim 9, wherein the first and fourth clock signals are non-overlapped when the first and fourth clock signals are in a low level.

11. The charge pump circuit as claim 8, wherein the first, second and third capacitors are NMOS transistors which sources and drains are coupled to each other respectively.

12. The charge pump circuit as claim 8, wherein the first, second and third equalization units are a first, second and third NMOS transistors respectively, gates of the first, second and third NMOS transistors are the control ends of the first, second and third equalization units, drains of the first, second and third NMOS transistors are the inputs of the first, second and third equalization units, and sources of the first, second and third NMOS transistors are the outputs of the first, second and third equalization units.

13. The charge pump circuit as claim 12, wherein the first and fourth clock signals are non-overlapped when the first and fourth clock signals are in a high level.

14. The charge pump circuit as claim 8, wherein the first, second and third capacitors are PMOS transistors which sources and drains are coupled to each other respectively.

15. The charge pump circuit as claim 8, wherein the input unit comprises:

a fourth equalization unit, for equalizing charges of an input and output of the fourth equalization unit, the input of the fourth equalization unit is coupled to the input of the input unit;

a fifth equalization unit, for equalizing charges of an input and output of the fifth equalization unit, the output of the fifth equalization unit is coupled to the output of the input unit;

a fourth capacitor, one end of the fourth capacitor is coupled to the output of the fourth equalization unit, and coupled to an control end of the fifth equalization unit for enabling or disabling the fifth equalization unit, another end of the fourth capacitor is coupled to a second clock signal; and a fifth capacitor, one end of the fifth capacitor is coupled to the output of the fifth equalization unit, and coupled to an control end of the fourth equalization unit for enabling or disabling the fourth equalization unit, another end of the fifth capacitor is coupled to a third clock signal.

16. The charge pump circuit as claim 15, wherein the input unit comprises:

a sixth equalization unit, for equalizing charges of an input and output of the sixth equalization unit, the input of the sixth equalization units is coupled to the input of the output unit;

a seventh equalization unit, for equalizing charges of an input and output of the seventh equalization unit, the input of the seventh equalization units is coupled to the input of the output unit, the output of the seventh equalization unit is coupled to the output of the output unit;

a eighth equalization unit, for equalizing charges of an input and output of the eighth equalization unit, the input of the eighth equalization units is coupled to the input of the output unit;

a sixth capacitor, one end of the sixth capacitor is coupled to control ends of the seventh and eighth equalization units for enabling or disabling the seventh and eighth equalization units, and also coupled to the output of the sixth equalization unit, another end of the sixth capacitor is coupled to the second clock signal; and a seventh capacitors, one end of the seventh capacitor is coupled to a control end of the sixth equalization unit for enabling or disabling the sixth equalization unit, and also coupled to the output of the eighth equalization unit, another end of the seventh capacitor is coupled to the third clock signal.

17. The charge pump circuit as claim 16, wherein the fourth, fifth, sixth and seventh capacitors are NMOS transistors which sources and drains are coupled to each other respectively; the fourth, fifth, sixth, seventh and eighth equalization units are a the fourth, fifth, sixth, seventh and eighth NMOS transistors respectively, gates of the fourth, fifth, sixth, seventh and eighth NMOS transistors are the control ends of the fourth, fifth, sixth, seventh and eighth equalization units, drains of the fourth, fifth, sixth, seventh and eighth NMOS transistors are the inputs of the fourth, fifth, sixth, seventh and eighth equalization units, and sources of the fourth, fifth, sixth, seventh and eighth NMOS transistors are the outputs of the fourth, fifth, sixth, seventh and eighth equalization units.

18. The charge pump circuit as claim 17, wherein the second and third clock signals are non-overlapped when the first and fourth clock signals are in a high level.

19. The charge pump circuit as claim 16, wherein the fourth, fifth, sixth and seventh capacitors are PMOS transistors which sources and drains are coupled to each other respectively; the fourth, fifth, sixth, seventh and eighth equalization units are a the fourth, fifth, sixth, seventh and eighth PMOS transistors respectively, gates of the fourth, fifth, sixth, seventh and eighth PMOS transistors are the control ends of the fourth, fifth, sixth, seventh and eighth equalization units, sources of the fourth, fifth, sixth, seventh and eighth PMOS transistors are the inputs of the fourth, fifth, sixth, seventh and eighth equalization units, and drains of the fourth, fifth, sixth, seventh and eighth PMOS transistors are the outputs of the fourth, fifth, sixth, seventh and eighth equalization units.

20. The charge pump circuit as claim 19, wherein the first and fourth clock signals are non-overlapped when the first and fourth clock signals are in a low level.

* * * * *